United States Patent [19]
Kronbetter

[11] Patent Number: 5,294,168
[45] Date of Patent: Mar. 15, 1994

[54] VEHICULAR WINDOW FRAME ASSEMBLY FOR OPPOSED, SLIDING WINDOW PANES

[75] Inventor: Clarence W. Kronbetter, St. Joseph, Mich.

[73] Assignee: Chardon Rubber Company, Chardon, Ohio

[21] Appl. No.: 926,827

[22] Filed: Aug. 7, 1992

[51] Int. Cl.⁵ ............................................. B60P 3/42
[52] U.S. Cl. ............................. 296/146.16; 49/475.1
[58] Field of Search ..................... 296/146.15, 146.16; 49/475

[56] References Cited

U.S. PATENT DOCUMENTS

| 4,431,228 | 2/1984 | Grise | 296/146 MX |
| 5,136,773 | 8/1992 | Mesnel et al. | 29/527.4 |

FOREIGN PATENT DOCUMENTS

| 3118559 | 11/1982 | Fed. Rep. of Germany | 296/146 N |
| 3223155 | 12/1983 | Fed. Rep. of Germany | 296/146 M |
| 3504907 | 8/1986 | Fed. Rep. of Germany | 296/146 N |
| 2138479 | 10/1984 | United Kingdom | 296/146 M |
| 2140067 | 11/1984 | United Kingdom | 296/146 M |

OTHER PUBLICATIONS

Chardon Rubber Company, GMC Truck and Bus 87CK Rear Sliding Window, Jul. 9, 1986, Drawings Numbered 1 and 2.

Primary Examiner—Joseph D. Pape
Attorney, Agent, or Firm—Renner, Kenner, Greive, Bobak, Taylor & Weber

[57] ABSTRACT

A window frame assembly for vehicular backlites having one or more sliding panes. The assembly has a frame portion with an inner and an outer periphery including channels which open through each periphery. The channel formed in the outer periphery houses the body portion of an elastomeric supporting strip which provides a flexible centering and protective support for the frame assembly when it is being installed in an opening in a vehicle body panel. A first and a second channel opens continuously through the inner periphery of the frame, and those channels, respectively, support sliding windows and fixed windows. The sliding windows are adapted to close the central portion of the frame and are slidable relative to the adjacent fixed windows. Lip seals are received in that channel which supports the fixed windows to provide a sealing interface with the sliding windows, at least when they are in the closed position.

6 Claims, 3 Drawing Sheets

VEHICULAR WINDOW FRAME ASSEMBLY FOR OPPOSED, SLIDING WINDOW PANES

TECHNICAL FIELD

The present invention relates generally to window frame assemblies. More particularly, the present invention relates to window frame assemblies for vehicles. Specifically, the present invention relates the frame assemblies for vehicular backlites having one or more sliding, central window panes and fixed, side window panes.

BACKGROUND OF THE INVENTION

Vehicles, such as pickup trucks, have a rear window, or backlite, that is assembled into an opening in the body panel immediately behind the operator's seat. These backlites are provided to the truck manufacturer, or the after-market, as window frame assemblies. The current window frame assemblies that are commercially available generally have a welded metal frame, usually aluminum, which is sized to fit in a body panel opening. The frame has a generally bow-shaped outline, when viewed in elevation, with the upper corners being curved to fit the body panel opening. The upper portion of the frame provides the bow shape, and the lower rail portion, which is generally linear, is welded to the ends of the upper portion. Specifically, the upper and lower portions have beveled ends which are welded together to form the metal frame.

A continuous channel, the opening of which faces inwardly, is provided in the frame to support the upper and lower edges of the sliding window pane, or panes. A second inwardly opening channel supports a pair of fixed window panes. The side edges of the fixed window panes, adjacent the sliding window pane(s), are supported by vertical struts which are secured between the upper and lower portions of the frame. The remaining sides of the fixed window panes are each secured to, and are sealed in, the frame. A separate seal, having a lip adapted to engage the sliding window pane(s), is provided along the upper and lower edges of the sliding window pane(s) to prevent leakage of moisture to the interior of the vehicle when they are closed.

On occasion, the outer surface of the window frame assemblies have been provide with various decorative treatments. As a general rule, however, the outer surface is simply an exposed aluminum surface, or, as is frequently encountered, the frame may be coated with an elastomeric material which also covers the exposed outer surface of the frame. When the metallic window frame is exposed, a closure member is disposed to provide a sealing interface with the sliding windows, which, when closed, are generally disposed centrally of the frame, and, when open, are positioned behind the fixed windows. These assemblies are often secured to the vehicle body panel by a bead of urethane adhesive material. It must be kept in mind, however, that the frame assembly must be positionably inserted in the opening of the body panel with extreme care in order to ensure that the paint on the body panel is not scratched by the exposed metal of the frame during the procedure by which the frame assembly is mounted on the body panel of the vehicle.

Those window frame assemblies having an elastomeric covering, or having the periphery encapsulated within a gasket, are of two types—one of which does not have any exposed metal edges, thereby minimizing the possibility of defacing, or scratching, the painted surface of the vehicle during installation of the frame assembly. The assemblies that are so covered, or encapsulated, do, however, require a considerable amount of assembly time. For example, the gasket must be stretched over the frame. Gaskets for this purpose are normally provided with a groove which cooperates with a metal edge on the body panel opening. A separate sealing member is usually provided and is secured in the same channel within which the fixed windows are supported.

In order to mount this type window, the frame assembly is positioned in the appropriate opening, and the groove, presented from the gasket is stretched over the edge of the body panel to secure the assembly in the opening. The assembler must take care not to cut the gasket on the exposed metal edge inasmuch as a cut could not only result in an air, or liquid, leak but also constitute a noise source during vehicle operation. If the gasket is cut, a urethane adhesive or sealant must be applied. This is time consuming and increases the cost of assembly. The assembler must also be aware of the sharpness of the metal edge so that injuries, due to lacerations, do not occur.

Those frame assemblies employing an elastomeric covering generally include an integrally formed seal that is bonded only at the outer facing surface of the metal frame. As such, this arrangement requires the exercise of considerable care during installation. This type of window frame assembly is normally bonded to the body panel using a urethane adhesive.

Yet other frame assemblies have been provided that use a coating which is sprayed onto, or otherwise bonded to, the surface of the metal frame. As might be expected, considerable care must be taken to prevent the thin coating from being scratched or cut, both during storage and during the procedure by which the frame assembly is mounted in the panel opening of a vehicle. This type frame assembly requires that the manufacturer invest in spraying, or bonding, equipment which is expensive to purchase, install and maintain.

SUMMARY OF THE INVENTION

It is, therefore, a primary object of the present invention to provide an improved window frame assembly having an elastomeric strip for supporting a metal frame in a predetermined relation to the receiving opening provided in a vehicle body panel.

It is another object of the present invention to provide an improved window frame assembly, as above, wherein a continuous support strip is disposed circumjacent the outer periphery of the window frame assembly.

It is further object of the present invention to provide an improved window frame assembly, as above, wherein a pair of sliding window panes are disposed in a first, continuous channel to be engaged by sealing members—the sealing members and the fixed window panes being disposed in linearly adjacent portions of a second, continuous channel.

It is still another object of the present invention to provide an improved window frame assembly, as above, wherein the first and second channels are separated by a continuous wall member and wherein the support strip has a portion disposed in a third continuous channel opening through the outer perimeter of the frame.

It is yet another object of the present invention to provide an improved window frame assembly, as above, wherein the support strip is disposed in an outwardly opening peripheral channel having a main body portion which communicates with the outer peripheral surface of the frame through a narrow slot portion.

These and other objects of the invention, as well as the advantages thereof over existing and prior art forms, which will be apparent in view of the following detailed specification, are accomplished by means hereinafter described and claimed.

In general, a frame assembly embodying the concepts of the present invention is adapted for mounting one or more sliding window means in an opening through the body panel of a vehicle. The frame assembly comprises a frame having an outer periphery, an inner periphery, an exposed face and a mounting face. A first inwardly opening channel, a second inwardly facing channel and an outwardly opening channel are provided in the frame. A protecting support having a body portion and a lip portion is employed. The body portion is received within the outwardly facing channel with the lip portion extending outwardly from the frame to engage the body panel of the vehicle. The lip portion serves to center the frame assembly relative to a window assembly receiving opening in the body panel.

One or more sliding window panes are disposed in the first, inwardly facing channel for movement between closed and open positions. A seal means is secured in the second, inwardly facing channel. That seal means has a lip means for sealingly engaging the sliding window panes when the sliding window panes are in the closed position.

One or more fixed window panes are disposed in the second, inwardly facing channel linearly adjacent to the seal means for closing a portion of the frame and overlapping the sliding window panes when the sliding window panes are moved to the open position.

To consider the present invention in greater detail, the frame assembly utilizes a welded aluminum frame and selectively positioned elastomeric members to provide a frame assembly that will permit simple installation into a body panel opening while protecting the painted surface of the body panel from scratches.

The welded metal frame is provided with an outwardly facing channel in the outer periphery. The channel has a bottom wall, side walls and a mouth opening. The mouth opening is defined by opposed protuberances in the nature of retaining ribs that extend inwardly from the sidewalls. The bottom wall and side walls define a main cavity within which the body portion of a supporting member is disposed.

The supporting member has a continuous lip portion which extends outward from the body portion through the mouth of the outwardly facing channel. The supporting member has sufficient elasticity to permit the body portion to be inserted through the mouth into the main cavity. The lip portion provides a protecting and centering function which acts circumjacent the outer periphery, or perimeter, of the metal frame. When the frame assembly is fitted into the opening of a body panel, the supporting lip prevents contact between the metal frame and the painted surface of the body panel.

The metal frame has two transversely spaced, inwardly facing channels that open through the inner periphery of the frame. One channel supports the sliding window panes, and the other channel supports the fixed window panes as well as the top and bottom sealing members which interact with the sliding window panes. One edge of each fixed window pane is supported in one of the vertical struts that extend between the bow and rail portions of the frame, and the remaining edges of each fixed window pane are supported directly from the frame.

One exemplary embodiment, of a window frame assembly embodying the concepts of the present invention is deemed sufficient to effect a full disclosure of the subject invention, and is shown by way of example in the accompanying drawings and is described in detail without attempting to show all of the various forms and modifications in which the invention might be embodied; the invention being measured by the appended claims and not by the details of the specifications.

DESCRIPTION OF AN EXEMPLARY EMBODIMENT

Figure 1:
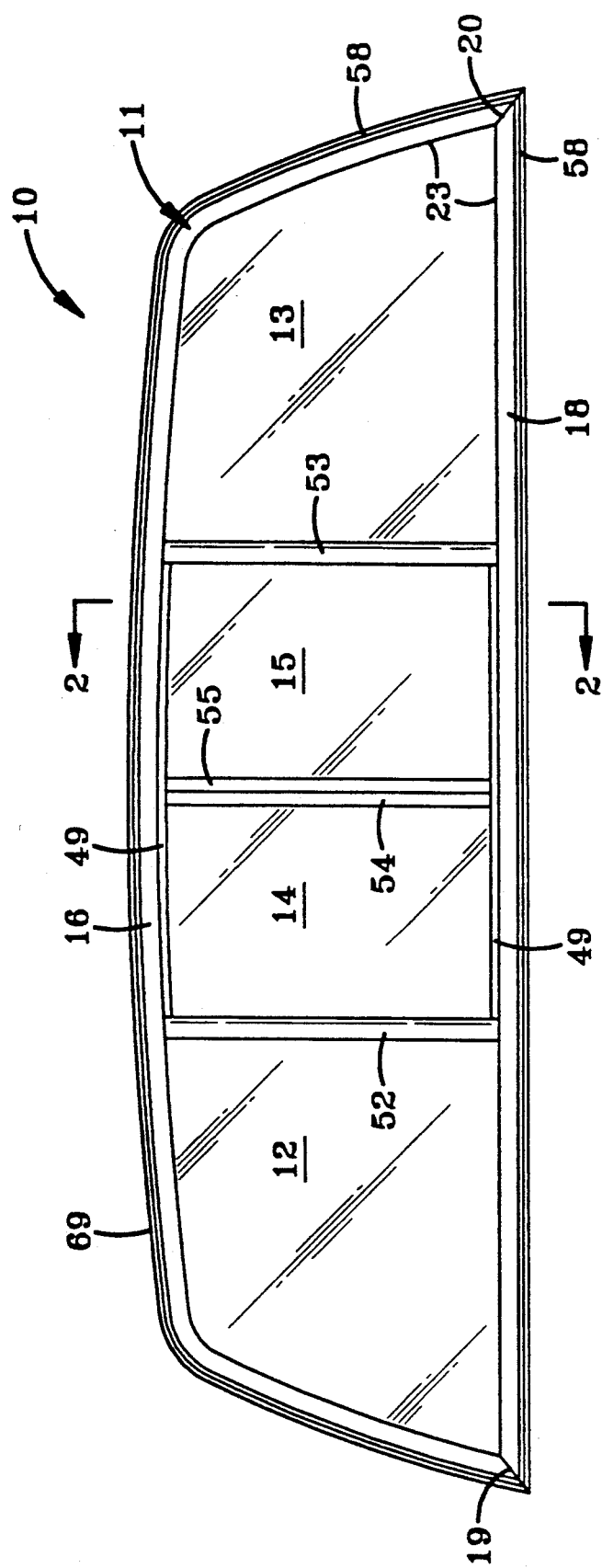
FIG. 1 is an elevational view of a frame assembly incorporating the present invention.

One representative form of a window frame assembly embodying the concepts of the present invention is designated generally by the numeral 10 on the accompanying drawings. As best seen from FIG. 1, the representative window frame assembly 10 includes of a metal frame 11, a pair of laterally spaced, fixed window panes 12 and 13 and a pair of sliding window panes 14 and 15. In the alternative, a single, sliding window pane can be provided and that arrangement is preferred by some vehicle operators. The metal frame 11 is a welded structure having an upper bow portion 16 and a lower, or bottom, rail portion 18 which are welded at the bevelled corners 19 and 20 formed at the intersection of the bow portion 16 with the opposite ends of the normally linear rail portion 18.

Figure 2:
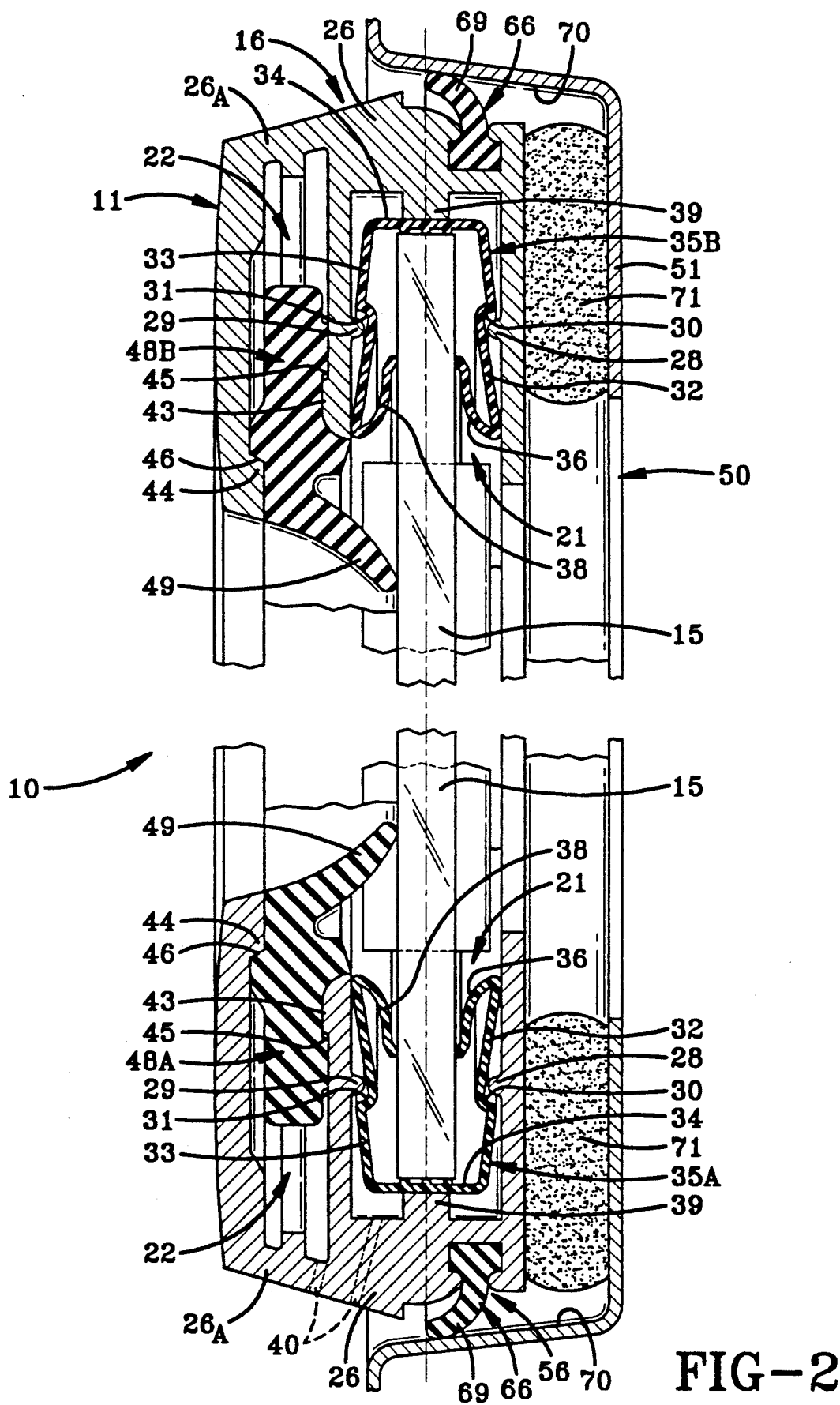
FIG. 2 is a vertical section taken substantially along line 2—2 of FIG. 1.
Figure 3:
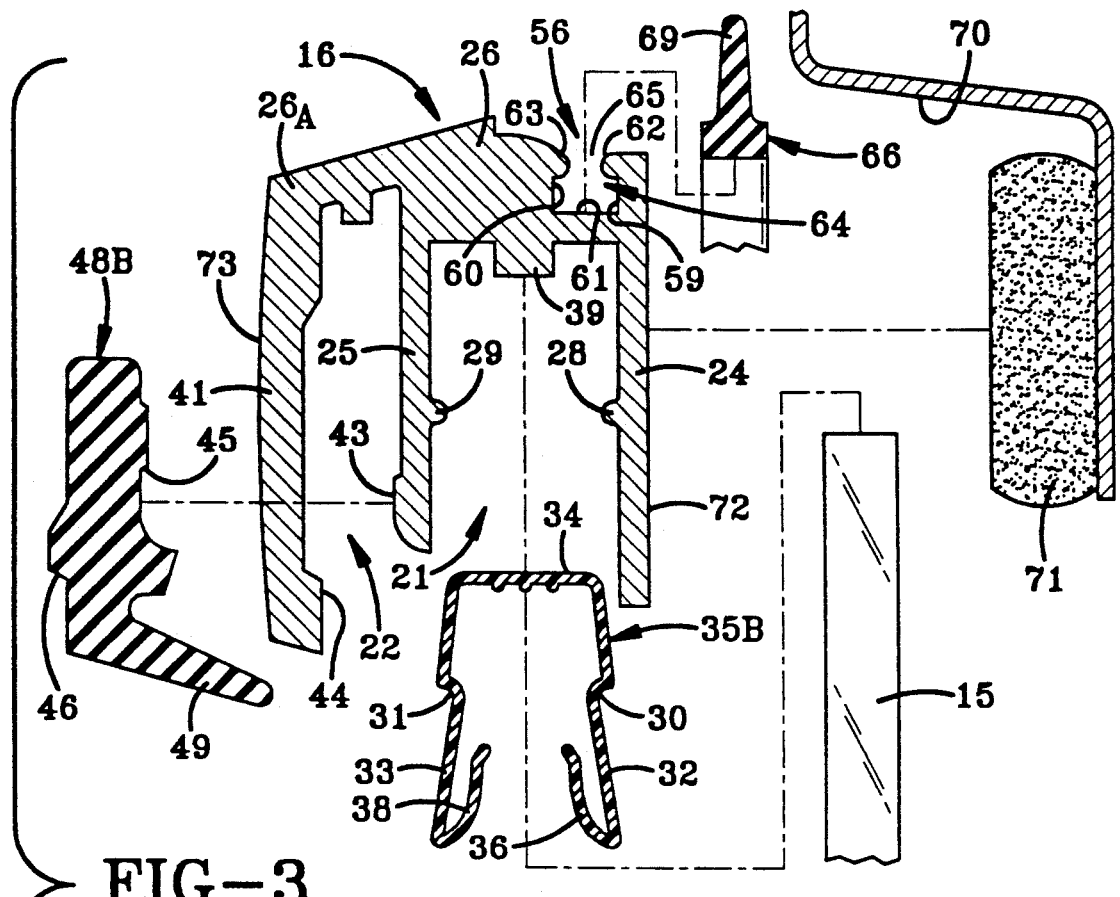
FIG. 3 is an exploded cross section of the frame assembly depicted in FIG. 2.
Figure 3:
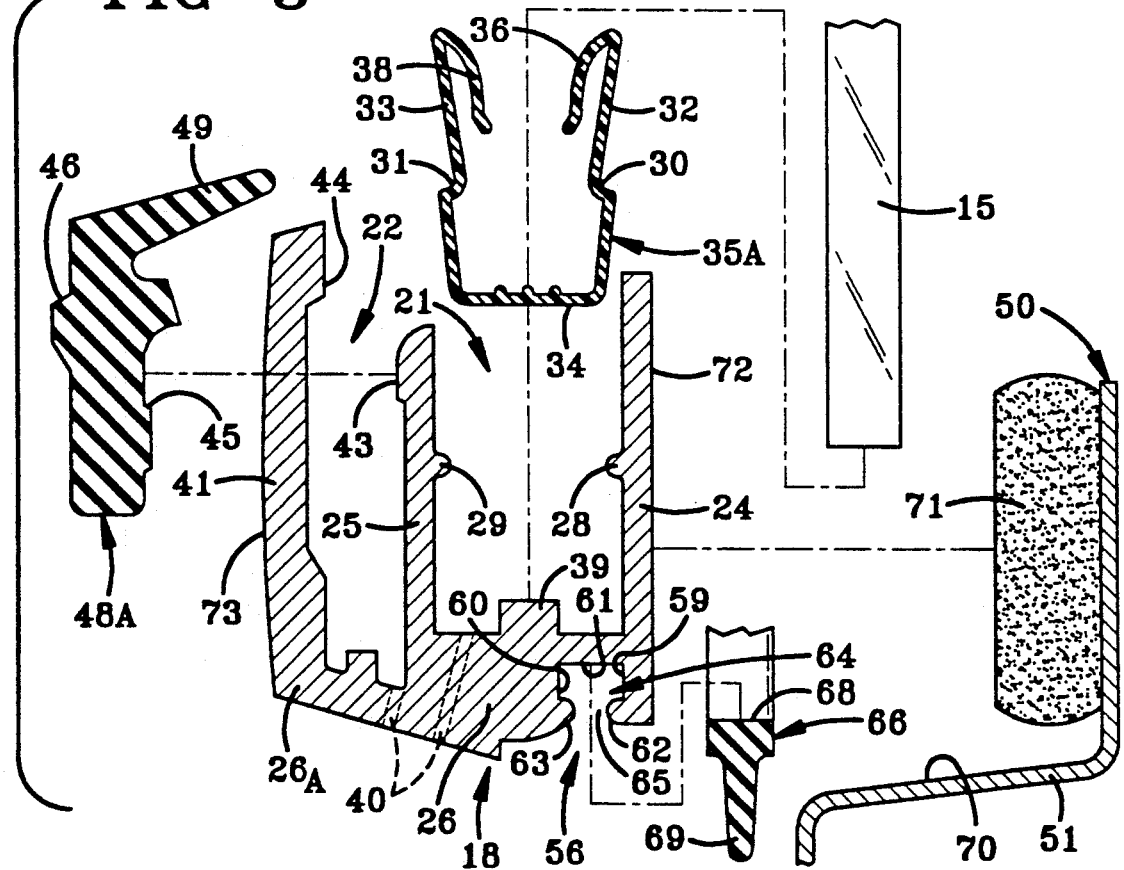

With reference to FIGS. 2 and 3, it will be observed that both the bow portion 16 and the rail portion 18 of the frame 11 have identical cross sections. As such, the description set forth herein as to the frame 11 shall apply as equally to the bow portion 16 as to the rail portion 18, unless a difference is specifically identified. Accordingly, the frame 11 has a pair of inwardly facing first and second channels 21 and 22, respectively, which open continuously about the inner periphery, or perimeter, 23 of the frame 11. Relative to the vehicle (not shown) in which the window assembly 10 is to be installed, the first channel 21 is the innermost channel, and the second channel 22 is the outermost channel.

The first, or innermost, channel 21 has transversely spaced, first and second side walls 24 and 25, respectively, which extend from a base wall 26. Side wall 24 serves as the inner side of the first channel 21, and the continuous wall 25 serves as the outer side of that channel. The side walls 24 and 25 present opposed protuberances in the nature of retaining ribs 28 and 29, respectively, which can be continuous or disposed at spaced locations. The retaining ribs 28 and 29 cooperate with corresponding notches 30 and 31 formed in the side walls 32 and 33 of the guide members 35. As will be hereinafter more fully explained, the guides 35 support the windows 14 and 15 so that they might slide along the direction of the first channel 21.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are two guides which are generally identified by the numeral 35, but the specific, individual guides are, therefore, identified as 35A and 35B in the specification and on the drawings. This same suffix convention shall be employed throughout the specification.

With continued reference to the guides 35, which may be conveniently made of a plastic material, the side walls 32 and 33 extend outwardly from a base wall 34. A pair of opposed spring walls 36 and 38 are secured to the distal ends of the side walls 32 and 33 and extend between the side walls 32 and 33 toward the base wall 34 of each guide 35A and 35B in substantially parallel relation to the side walls 32 and 33. The spring walls 36 and 38 are disposed cooperatively to engage the sliding window panes 14 and 15 to maintain the sliding panes substantially centered transversely of the channel 21. The guides 35 can extend the length of the usable, linear portion of channel 21 in both the bow portion 16 and the rail portion 18 of the frame 11, or the guides 35 may each have end surfaces, not shown, which abut the edges of the sliding window panes 14 and 15 and move therewith.

A rib 39 extends perpendicularly from the base wall 26 within the first channel 21. The rib 39 thus supports the guide 35 in spaced relation with respect to the base wall 26. A plurality of drain passages 40 penetrate the base wall 26 in that portion of the channel 21 which is formed in the bottom rail 18. These drain passages 40 will prevent the accumulation of moisture that might reach the channels 21 and 22. The portion of the channels 21 and 22 which are formed in the bow portion 16 will drain to the bottom rail 18. The bow portion 16 does not, therefore, need to have drainage passages.

The second, outermost channel 22 is bounded by the continuous, common wall 25, which serves as the inner side wall, by an outer side wall 41 and by a base wall 26, which constitutes an extension of the base wall 26 of the first channel 21. The side walls 25 and 41 thus define the inwardly facing channel 22 which also opens continuously along the inner periphery, or perimeter, 23 of the frame 11. The respective side walls 25 and 41 present generally opposing protuberances in the nature of latch ribs 43 and 44, which cooperate with the securing shoulders 45 and 46 that extend outwardly in opposite directions from each sealing member 48A and 48B. The latch ribs 43 and 44 cooperate with the respective securing shoulders 45 and 46 to maintain the sealing members 48 in the desired position in the second channel 22. The sealing members 48A and 48B each have a lip portion 49 which is disposed in abutment with the sliding window panes 14 and 15 to prevent water and dirt from entering the vehicle through the opening 50 formed in the body panel 51 to receive the window frame assembly 10. The sealing members 48A and 48B are, respectively, secured in the second channel 22 in both the upper bow portion 16 and the lower rail portion 18 of the frame 11 and therefore sealingly engage both the upper and lower edges of the sliding window panes 14 and 15, at least when they are in the closed position.

The fixed window panes 12 and 13 are also disposed in the second channel 22, but the fixed window panes are separated from the sealing members 48A and 48B by the vertical frame struts 52 and 53 (FIG. 1). The fixed windows 12 and 13 are secured in the channel 22 in both the upper bow portion 16 and the lower rail portion 18 by using a conventional mounting means such as rubber seals or adhesives. Thus, it will be apparent that the entire volume of the second channel 22 is filled with the combination of the sealing members 48A and 48B as well as the fixed window panes 12 and 13.

The sliding window panes 14 and 15 each have a respective side stiles 54 and 55 affixed thereto which provides a gripping means as well as a member from which a latch means, not shown, may be mounted for use by the operator to open, close and secure the sliding window panes 14 and 15. Gripping and latching mechanisms are well known to the art, but a particularly good example thereof is the subject of U.S. Pat. No. 5,028,082, owned by the assignee hereof.

The frame 11 also has an outwardly facing, or opening, channel 56 which is formed in the outer perimeter, or periphery, 58 of the frame 11. The channel 56 is defined by side walls 59 and 60 as well as a base wall 61 and a pair of opposed ribs 62 and 63. The area encompassed by the side walls 59 and 60 and by the base wall 61 defines the main cavity 64 of the channel 56, while the ribs 62 and 63 define the mouth 65 of the channel 56. A centering, supporting and protecting member 66 is received in the channel 56. The centering member 66 has a substantially rectangular body portion 68 which is disposed in the main cavity 64 of the channel 56 and an outwardly extending lip portion 69 which extends through the mouth 65. The centering member 66 is continuous about the outer perimeter 58 of the frame 11. The centering member 66 is preferably made of an elastomer so that it can be stretched over the outer perimeter 58 of the frame 11 to align the body portion 68 with the mouth 65. The body portion 68 is then compressed through the mouth 65 to be received within the main cavity 64 of the channel 56. In the alternative, the centering member 66 can be extruded in a single strip and cut to a length equal to the circumference of the outer perimeter 58. The ends of the strip forming the centering member 66 may then be bonded at their juncture after the strip is inserted in the channel 56.

During the process of mounting the frame assembly 10 within the opening 50 in the body panel 51 of the vehicle the lip portion 69 of the centering member 66 will engage the painted surface 70 on the body panel 51 of the vehicle to prevent scratches, or other marring, of the surface 70. The elasticity of the member 66 will tend to center the frame assembly 10 in the opening 50 of the body panel 51. The frame assembly 10 may be secured in the opening 50 and sealed to the body panel 51, as by a urethane adhesive 71 which may be applied in a conventional manner to either the body panel 51 or the mounting face 72 on the frame 11 prior to the moment at which these two structures are brought into abutment. It is generally deemed preferable to apply the urethane adhesive 71 to the body panel 51. In any event, it is the rear face 73 of the frame 11 that will be exposed to the exterior of the vehicle.

Fabrication of the window frame assembly 10 can best be discerned from FIG. 3, which is an exploded view thereof. The guides 35A and 35B are inserted in selected portions of the channel 21, which extends continuously along the bow and rail portions 16 and 18, respectively, of the frame 11. The guides 35 are pressed into the appropriate portions of the channel 21 until the retaining ribs 28 and 29 are seated in the respective notches 30 and 31. This will maintain the guides 35 in the proper location and permit the sliding window panes 14 and 15 to be installed prior to the time the bow portion 16 is bonded to the rail portion 18. The adhesive, or sealant, for the fixed window panes 12 and 13 is preferably placed in the second channel 22 prior to, or simultaneous with, the installation of the fixed window panes 12 and 13. After the fixed window panes 12 and 13, and the sliding window panes 14 and 15, are positioned in the proper location, the bevelled corners 19 and 20 are brought into registration and welded, or otherwise bonded together. Following the securement of the corners 19 and 20 the sealing members 48A and 48B are installed in position in the proper portions of the continuous second channel 22-i.e.: in both the bow portion 16 and the rail portion 18 of the frame 11. The body portion 68 of the centering member 66 is then installed in channel 56 with the lip portion 69 extending outward through the mouth 65. The window frame assembly 10 is now ready for installation in the opening 50 of the body panel 51.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a window frame assembly embodying the concepts of the present invention permits facile assembly thereof without damage to the vehicle in which it is to be mounted and also accomplishes the other objects of the invention.

I claim:

1. A frame assembly for mounting one or more sliding window means in an opening through a body panel of a vehicle, the frame assembly comprising:
   a frame having an outer periphery, an inner periphery, an exposed face and a mounting face;
   a continuous, first inwardly opening channel in said frame;
   a continuous, second inwardly facing channel in said frame;
   a continuous, outwardly opening channel in said frame;
   a protecting support means having a body portion and a lip portion;
   said body portion secured in said outwardly facing channel;
   said lip portion extending only outwardly from said body portion prior to installation and engaging the body panel for centering the frame assembly relative to the opening in the body panel after installation;
   sliding window means disposed in said continuous, first, inwardly facing channel for movement between closed and open positions;
   seal means secured in said continuous, second, inwardly facing channel;
   said seal means having lip means for sealingly engaging said sliding window means when said sliding window means is in the closed position; and,
   fixed window means disposed in said second inwardly facing channel linearly adjacent said seal means for closing a portion of the frame and overlapping said sliding window means when said sliding window means is moved to the open position.

2. A frame assembly, as set forth in claim 1, further comprising:
   means for securing said mounting face to the body panel in closing relation with the opening in the body panel.

3. A frame assembly, as set forth in claim 1, wherein said second inwardly directed channel further comprises:
   spaced side walls with latch surface means formed thereon; and,
   said seal means having spaced securement means cooperating with said latch surface means for securing said seal means in said second inwardly directed channel.

4. A frame assembly, as set forth in claim 1, further comprising:
   one or more guides received within said first inwardly directed channel; and,
   said guides permitting selective movement between said sliding windows with respect to the frame.

5. A frame assembly, as set forth in claim 4, wherein each said guide comprises;
   a base portion;
   a pair of transversely spaced side walls extending outwardly of said base portion;
   a spring wall secured to each of said side walls; and,
   said spring walls cooperatively maintaining said sliding windows therebetween.

6. A frame assembly, as set forth in claim 5, further comprising:
   a pair of opposingly disposed protuberances within said first channel; and,
   a pair of notches on each said guide cooperatively to engage said protuberances in order to retain said guide within said first channel.

* * * * *